US010467697B2

(12) United States Patent
Bensemana

(10) Patent No.: US 10,467,697 B2
(45) Date of Patent: Nov. 5, 2019

(54) METHOD AND SYSTEM FOR BUILDING AN ENHANCED INVESTMENT PORTFOLIO

(71) Applicant: Laurent Bensemana, Hampstead (CA)

(72) Inventor: Laurent Bensemana, Hampstead (CA)

( * ) Notice: Subject to any disclaimer, the term of this patent is extended or adjusted under 35 U.S.C. 154(b) by 530 days.

(21) Appl. No.: 15/201,135

(22) Filed: Jul. 1, 2016

(65) Prior Publication Data

US 2017/0301026 A1 Oct. 19, 2017

Related U.S. Application Data

(60) Provisional application No. 62/323,945, filed on Apr. 18, 2016.

(51) Int. Cl.
  *G06Q 40/06* (2012.01)
  *G06K 9/00* (2006.01)

(52) U.S. Cl.
  CPC ......... *G06Q 40/06* (2013.01); *G06K 9/00442* (2013.01); *G06K 2209/01* (2013.01)

(58) Field of Classification Search
  CPC .................................................... G06Q 40/00
  USPC ........................................................ 705/35
  See application file for complete search history.

(56) References Cited

U.S. PATENT DOCUMENTS

| | | | |
|---|---|---|---|
| 5,812,987 A * | 9/1998 | Luskin | G06Q 40/00 705/36 R |
| 5,913,202 A | 6/1999 | Motoyama | |
| 6,546,133 B1 | 4/2003 | Temkin et al. | |
| 7,165,044 B1 * | 1/2007 | Chaffee | G06Q 40/00 705/35 |
| 7,188,076 B2 | 3/2007 | Bensemana | |
| 7,464,052 B1 * | 12/2008 | Coppola, III | G06Q 40/00 705/35 |
| 8,027,900 B1 * | 9/2011 | Chaffee | G06Q 40/04 705/37 |
| 8,266,048 B2 | 9/2012 | Bensemana | |
| 8,311,927 B2 | 11/2012 | Bensemana | |
| 2002/0042764 A1 * | 4/2002 | Gardner | G06Q 40/00 705/35 |
| 2002/0065752 A1 | 5/2002 | Lewis | |
| 2002/0147671 A1 * | 10/2002 | Sloan | G06Q 40/00 705/36 R |
| 2002/0194100 A1 * | 12/2002 | Choban | G06Q 10/10 705/36 R |
| 2003/0204460 A1 | 10/2003 | Robinson et al. | |

(Continued)

FOREIGN PATENT DOCUMENTS

WO 2001084384 A2 5/2001
WO 2001046876 A2 6/2001

(Continued)

*Primary Examiner* — Kirsten S Apple
(74) *Attorney, Agent, or Firm* — Fish & Richardson P.C.

(57) ABSTRACT

A method, system and computer readable medium are provided for building an enhanced portfolio of an individual's investments. The enhanced portfolio is built by receiving account information from one of a plurality of sources in one of a plurality of formats, identifying the format and the source, selecting a recognition template corresponding to the format and source, applying the recognition template to extract account data from portions of the financial information predefined in the template, and aggregate the extracted data with data extracted from previously received financial information from other sources and/or in other formats.

23 Claims, 11 Drawing Sheets

(56) References Cited

U.S. PATENT DOCUMENTS

| | | | |
|---|---|---|---|
| 2003/0216991 A1 | 11/2003 | Baker | |
| 2004/0083134 A1 | 4/2004 | Spero et al. | |
| 2005/0203885 A1 | 9/2005 | Chenevich et al. | |
| 2005/0246260 A1* | 11/2005 | Hodgdon | G06Q 40/00 705/36 R |
| 2006/0015429 A1* | 1/2006 | Sullivan | G06Q 40/00 705/35 |
| 2006/0074787 A1* | 4/2006 | Perg | G06Q 40/00 705/35 |
| 2006/0089902 A1* | 4/2006 | Kim | G06Q 40/02 705/38 |
| 2006/0212376 A1* | 9/2006 | Snyder | G06Q 40/00 705/35 |
| 2006/0293987 A1* | 12/2006 | Shapiro | G06Q 40/00 705/35 |
| 2007/0055599 A1 | 3/2007 | Arnott | |
| 2007/0061237 A1* | 3/2007 | Merton | G06Q 40/08 705/36 R |
| 2007/0061238 A1* | 3/2007 | Merton | G06Q 40/00 705/36 R |
| 2007/0130035 A1* | 6/2007 | Carden | G06Q 40/00 705/35 |
| 2008/0162173 A1 | 7/2008 | Pechenik et al. | |
| 2008/0243715 A1 | 10/2008 | Stellhorn et al. | |
| 2009/0024539 A1* | 1/2009 | Decker | G06Q 40/02 705/36 R |
| 2012/0109792 A1* | 5/2012 | Eftekhari | G06F 21/31 705/31 |
| 2012/0221376 A1* | 8/2012 | Austin | G06Q 40/06 705/7.28 |
| 2013/0018819 A1* | 1/2013 | Willis | G06Q 40/06 705/36 R |
| 2013/0173496 A1* | 7/2013 | Matheson | G06Q 40/06 705/36 R |
| 2013/0346302 A1* | 12/2013 | Purves | G06Q 20/102 705/40 |
| 2014/0258063 A1 | 9/2014 | Chourasia et al. | |
| 2014/0289166 A1* | 9/2014 | Wyrough | G06Q 40/06 705/36 R |
| 2014/0330751 A1* | 11/2014 | Mager | G06Q 40/025 705/36 R |
| 2017/0301026 A1* | 10/2017 | Bensemana | G06Q 40/06 |

FOREIGN PATENT DOCUMENTS

| | | |
|---|---|---|
| WO | 200219229 A2 | 3/2002 |
| WO | 200241117 A2 | 5/2002 |
| WO | 200421117 A2 | 3/2004 |
| WO | 2008063164 A2 | 8/2009 |
| WO | 2014089672 A1 | 6/2014 |

* cited by examiner

| ASSET REVIEW | SECURITY SYMBOL | QTY | MKT PRICE | BOOK VALUE | MARKET VALUE |
|---|---|---|---|---|---|
| COMMON SHARES | | | | | |
| AGRIUM INC | AGU | 23 | 132.70 | 3,053.87 | $3,044.51 |
| BANK OF NOVA SCOTIA | BNS | 23 | 64.470 | 3,197.80 | $2,901.15 |
| BCE INC | BCE | 45 | 53.060 | 2,968.56 | $2,971.36 |
| CAE INC | CAE | 56 | 14.870 | 2,744.91 | $2,929.39 |
| CONSTELLATION SOFTWARE | CSU | 6 | 493.660 | 1,822.40 | $2,975.16 |
| CI FINANCIAL | CIX | 87 | 33.000 | 2,957.30 | $2,923.20 |
| CIBC | CM | 32 | 92.070 | 3,220.32 | $2,946.24 |
| COGECO | CCA | 44 | 72.240 | 2,964.97 | $3,178.56 |
| ENERCARE | ECI | 210 | 13.300 | 3,032.67 | $2,793.00 |
| ENBRIDGE | ENB | 53 | 58.410 | 2,859.31 | $3,095.73 |
| EMERA | EMA | 75 | 39.340 | 3,025.22 | $2,950.50 |
| ISHARES US | XHY | 337 | 20.520 | 7,161.25 | $6,915.24 |

FIG. 2B

Account activity since your last statement

| Date settled | Activity | Description | Qty | Price | Transaction amount (CAD) |
|---|---|---|---|---|---|
| Aug 11 | Interest | HTC GIC 1.60% AM 11AG14 | 100,000 | | 789.04 |
| Aug 11 | Redeemed | HTC GIC 1.60% AM 11AG14 | (100,000) | | 100,000.00 |
| Aug 13 | FX | US/CND 6Y0Y8MB@1.0905 | | | 109,050.00 |
| Aug 14 | Bought | HT GIC 1.9% 14AG15A NEXT COUPON DATE AUG 14,2 INT FLAT | 70,000 | 100.000 | (70,000.00) |
| Aug 14 | Bought | B2B TR H/I IA-A/NL/N AS OF AUG 13,2014 | 118,915.600 | 1.000 | (118,915.60) |
| Aug 29 | Tax PD Dividend | ISHRS 1-5Y LADD CP BD ETF | 26,631 | | 1,765.64 |
| Aug 29 | Tax PD Dividend | ISHRS 1-5Y LAD GOV BD ETF | 13,396 | | 715.88 |
| Aug 29 | Tax PD Dividend | ISHRS CORE S&P/TSX COMP | 7,168 | | 600.68 |

FIG. 3A

Activity Data

| ☑ | Account | Total Amount | Activity Type | Commission | Accrued Interest | Activity Description | Quantity |
|---|---------|--------------|---------------|------------|------------------|----------------------|----------|
| ☐ | 12345 ▼ | 789.04 | Interest | | | HTC GIC 1.60% AM IIAGI4 | 100000 |
| ☐ | 12345 ▼ | 10000.00 | Redeemed | | | HTC GIC 1.60% AM IIAGI4 | -100000 |
| ☐ | 12345 ▼ | 109050.00 | FX | | | US/CND 6YO68MB 1.0905 | |
| ☐ | 12345 ▼ | -70000.00 | Bought | | | HTC GIC 1.9% 14AG15A NB | 700.00 |
| ☐ | 12345 ▼ | -118915.60 | Bought | | | B2B TR H/I IA-A/NL/N AS | 118915.600 |
| ☐ | 12345 ▼ | 1765.64 | Tax Pd Dividend | | | ISHRS 1-5Y LAD CP BD | 26631 |
| ☐ | 12345 ▼ | 715.88 | Tax Pd Dividend | | | ISHRS 1-5Y LADD GOV BD | 13396 |
| ☐ | 12345 ▼ | 600.68 | Tax Pd Dividend | | | ISHRS CORE S&P/TSX CO | 7168 |

FIG. 3B

Details of holding in your account (continued)

| Description | Qty | Location Custody or Segregated | Market price as of Aug 31 '14 | Book Value ($) | Market values as of Aug 31 '14 (CAD) | % |
|---|---|---|---|---|---|---|
| Equities | | | | | | |
| ISHARES S&P/TSX COMP ETF (XMD) | 6,626 | S | 26.880 | 159,977.55 | 178,106.88 | 8.3 |
| ISHARES S&P/TSX S/CAP ETF (XCS) | 14,688 | S | 17.880 | 245,872.70 | 262,621.44 | 12.3 |
| ISHRS 1-5Y LAD GOV BD ETF (CLF) | 13,396 | S | 19.300 | 259,732.34 | 258,542.80 | 12.1 |
| ISHRS 1-5Y LADD CP BD ETF (CBO) | 26,631 | S | 19.660 | 525,875.35 | 523,565.46 | 24.5 |
| ISHRS CORE S&P/TSX COMP (XEI) | 7,168 | S | 24.000 | 161,747.99 | 172,032.00 | 8.1 |
| POWERSHR FTSE RAFI CD ETF (PXC) | 12,934 | S | 26.090 | 313,120.74 | 337,448.06 | 15.8 |
| Total Equities | | | | | 1,732,316.64 | |
| Total Holdings in your account | | | | | 2,133,364.44 | 100% |

FIG. 3C

| Position Data | | | | | | | |
|---|---|---|---|---|---|---|---|
| ☑ | Account | Asset Class | Security Description | Quantity | Close Price | Market Value | Book Value |
| ☐ | 12345 ▾ | Stock ▾ | ISHARES S&P/TSX COMP | 6626.00 | 26.880 | 178106.88 | 159977.73 |
| ☐ | 12345 ▾ | Stock ▾ | ISHARES S&P/TSX S/CAP | 14688.00 | 17.880 | 262621.44 | 275872.70 |
| ☐ | 12345 ▾ | Stock ▾ | ISHRS 1-5Y LAD GOV BD | 13396.00 | 19.300 | 258542.80 | 259732.34 |
| ☐ | 12345 ▾ | Stock ▾ | ISHRS 1-5Y LADD CP BD | 26631.00 | 19.660 | 523565.46 | 525875.35 |
| ☐ | 12345 ▾ | Stock ▾ | ISHRS CORE S&P/TSX | 7168.00 | 24.000 | 172032.00 | 161747.99 |
| ☐ | 12345 ▾ | Stock ▾ | POWERSHR FTSE RAFI C | 12934.00 | 26.090 | 337448.06 | 313120.74 |

FIG. 3D

| Data as of: 2015/09/23 | | | | | | |
|---|---|---|---|---|---|---|
| | Client: John Doe | | | | | |
| ▶ Portfolio-based Options | PORTFOLIO | | | | | ⟵ 400 |
| Copy Portfolio | | CAD  USD | | | | |
| Manage Accounts and Uploads | % OF TOTAL | | SUMMARY | DETAILED | QUANTITY | SYMBOL |
| Add Activities | | | | | | |
| Activities | TOTAL (INCLUDING CASH BALANCE) | | | | | |
| | -0.1% | ▶ CASH BALANCE | | | | |
| ROR | 0.0% | Canadian Cash Balance | | | | |
| IRR | -0.1% | U.S. Cash Balance | | | | |
| Asset Allocation | 6.7% | ▶ FIXED INCOME SECURITIES | | | | |
| Export | 6.7% | U.S. INCOME SECURITIES | | | | |
| Inv. Guide | 3.4% | ○ ABBEY NATL TREASURY | | | 180,000.00 | RTJ |
| Reports | 2.0% | ○ ACTAVIS FUNDING | | | 55,000.00 | RTM |
| | 2.2% | ○ FREDDIE MAC | | | 120,000.00 | RTG |
| | 91.9% | ▶ STOCKS | | | | |
| | 91.9% | U.S. STOCKS | | | | |
| | 6.7% | ○ ABB LTD-REG | | | 2,945 | RPA |

FIG. 4

Data as of: 2015/09/23

▶ Portfolio-based
  Options
Copy Portfolio
Manage Accounts
and Uploads
Add Activities
▶ Activities
  Exit Activities
ROR
IRR
Asset Allocation
Export
Inv. Guide
Reports Client: John Doe

PORTFOLIO

ACTIVITY SEARCH

○ Symbol    ○ CUSIP    ○ Code

[SECURITY]

Search by:    ● Process Date

Starting Date [ ]    Ending Date [ ]

| | ACCOUNT | PROCESS DATE | TRADE DATE | SETTLEMENT DATE | ACTIVITY DATE | SYMBOL OR CUSIP | |
|---|---|---|---|---|---|---|---|
| ○ | 54321 | 2015/10/31 | 2015/10/31 | 2015/10/31 | NET CASH TRANSFER | | NET CASH TRANSFER TO/FROM CORE CASH ACCOUNT |
| ○ | 67890 | 2015/10/31 | 2015/10/31 | 2015/10/31 | SWEEP PURCHASE | | FEDERATED SHORT-TERM US |
| ○ | 54321 | 2015/10/31 | 2015/10/31 | 2015/10/31 | NET CASH TRANSFER | | NET CASH TRANSFER TO/FROM CORE CASH ACCOUNT |
| ○ | 12345 | 2015/10/30 | 2015/10/30 | 2015/10/31 | SALE | | MICROCHIPS TECHNOLOGY INC |
| ○ | 54321 | 2015/10/30 | 2015/10/30 | 2015/11/04 | NET CASH TRANSFER | | NET CASH TRANSFER TO/FROM CORE CASH ACCOUNT |
| ○ | 12345 | 2015/10/30 | 2015/10/30 | 2015/11/05 | CASH DIVIDEND | | QUAKER CHEMICAL CORP |
| ○ | 12345 | 2015/10/30 | 2015/10/30 | 2015/11/04 | PURCHASE | | POWER INTEGRATIONS INC |

METHOD AND SYSTEM FOR BUILDING AN ENHANCED INVESTMENT PORTFOLIO

RELATED PATENT APPLICATION

The present application claims priority from U.S. Provisional Application No. 62/323,945, filed Apr. 18, 2016, the entire disclosure of which is incorporated herein by reference.

TECHNICAL FIELD

The technical field generally relates to tools for handling financial data. More particularly, it relates to methods and systems for building an enhanced investment portfolio and profile of an individual, using limited information provided by financial institutions and other sources in a variety of formats.

BACKGROUND

The diversity of available data sources with regards to financial information is critical in the ability to identify, recognize, and build a more efficient and accurate investment profile of an individual (person or entity). Currently there exists a substantial barrier between financial institutions and their clients with regards to the quality, depth, and availability of financial information. As it stands, financial institutions are hesitant to release/make available all the parameters of a given client's financial portfolio. In effect, they provide what is deemed to be "necessary information" which is a basic amount, while the remainder remains "best guess" or unknown.

As can be appreciated, the limited amount of information provided by financial institutions can be insufficient in some cases in order to allow individuals to make informed financial decisions. There is therefore a need to leverage the limited information made available by financial institutions in order to build a more complete investment portfolio for individuals.

SUMMARY

Generally speaking, an object of the present disclosure is to provide an enhanced tool or service whereby limited information provided by various financial institutions can be combined and interpreted in order to generate an enhanced investment portfolio of an individual. Efficiencies can be increased in certain financial-service industries by reducing (possibly eliminating) the amount of manual data entry required as well as the management of documents required to service clients. This can directly result in a reduction of labor hours, which can subsequently result in a reduction of overhead costs.

According to an aspect, a system for building an individual's investment portfolio is provided. The system includes a plurality of modules configured to ingest data from a variety of data sources, extract pertinent data from the data sources, store the extracted data centrally, combine and consolidate the extracted data in order to build an investment portfolio, and allow a user to access the investment portfolio. In an embodiment, the system includes a module for ingesting data from a direct feed from financial institutions, a module for ingesting data from websites, a module for ingesting data from paper or digital statements, a module for ingesting data from spreadsheets, and a module for ingesting data manually inputted by users. In an embodiment, the investment portfolio is made available through a web-portal generated by the system, wherein the web-portal presents the extracted data organized and arranged in an interactive portfolio. In an embodiment, the system further includes a module for augmenting or completing data extracted from a data source using rules learned from previously ingested data or data ingested from other sources.

According to an aspect, a method for building an individual's investment portfolio is provided. The method includes the steps of ingesting data from a variety of data sources, extracting pertinent data from the data sources, storing the extracted data centrally, and combining and consolidating the extracted data in order to build an individual's investment portfolio. In an embodiment, the method includes the step of ingesting data from at least one of a direct feed from financial institutions, websites, paper or digital statements, spreadsheets, and manual input from users. In an embodiment, the method further includes the step of augmenting or completing data extracted from one of the data sources using rules learned from previously ingested data or data ingested from another data source.

According to an aspect, a method for building an enhanced portfolio of an individual's investments is provided. The method includes the steps of: a) receiving account information relating to at least one of the individual's investment accounts, the account information being received from one of a plurality of sources in one of a plurality of formats; b) determining a source and a format of the received account information; c) automatically selecting a recognition template corresponding to the determined source and format, the recognition template being selected from a plurality of recognition templates corresponding to different ones of the plurality of sources and formats; d) applying the selected recognition template to extract account data from predefined portions of the account information, said predefined portions being defined in the selected recognition template; and e) building the enhanced portfolio by aggregating the extracted account data with account data extracted from previously received account information.

In an embodiment, the method includes generating a comprehensive report of the enhanced portfolio including enhanced data relating to the individual's enhanced portfolio, said enhanced data being obtained through the aggregation of the account data. In an embodiment, the enhanced data includes metrics of historical, current or projected performance of the individual's investments calculated using the aggregated account data.

In an embodiment, upon determining that the format of the received account information corresponds to an account statement, step d) includes directing an optical character recognition (OCR) engine to extract the account data from the account statement according to a visual arrangement of the account statement.

In an embodiment, aggregating the extracted account data includes storing the extracted account data in an enhanced portfolio database, and each of the plurality of recognition templates includes a map between the predefined portions of account information and fields of the enhanced portfolio database, step d) further including mapping the extracted account data to fields of the enhanced portfolio database as defined in the map. In an embodiment, the map defines a relationship between terms used in the account data and predetermined activity types, and step d) includes recognizing said terms and creating records in the enhanced portfolio database corresponding to said activity types. In an embodiment, the method further includes the step of generating a validation graphical user interface (GUI), the validation GUI displaying the account information in a comparative view with the extracted account data and corresponding associated fields of the enhanced portfolio database, the validation GUI allowing a user to validate and modify the extracted data prior to storage in the enhanced portfolio database.

In an embodiment, aggregating the extracted account data includes consolidating the extracted account data with account data extracted from account information previously received from another source. In an embodiment, consolidating the extracted account data includes matching terms in the extracted account data with similar terms in the account data extracted from account information previously received from another source, and relabeling the terms in the extracted data to conform to the similar terms in the account data extracted from account information previously received from another source. In an embodiment, consolidating the extracted data includes determining duplicated data in the extracted data and the account data extracted from account information previously received from another source, and merging the extracted data with the account data extracted from account information previously received from another source. In an embodiment, the method further includes generating a merge GUI, said merge GUI allowing a user to identify the duplicated data, and to initiate a merge of said duplicated data.

In an embodiment, the received account information includes a current periodic account statement, and aggregating the extracted account data includes consolidating the extracted account data with account data extracted from a previous periodic account statement already stored in the enhanced portfolio.

In an embodiment, the method further includes the step of identifying investment types in the individual's enhanced portfolio, and comparing said investment types to a predetermined set of investment profiles in order to determine a closest matching investment profile of the individual. In an embodiment, the method further includes comparing historical holdings in the individual's enhanced portfolio with the predetermined set of investment profiles in order to identify a change in the individual's investment profile. In an embodiment, the enhanced portfolio includes account data from a plurality of investment accounts, and the method further includes comparing holdings in the plurality of accounts to identify inconsistencies between the individual's investment profile and the individual's actual holdings. In an embodiment, the method further includes automatically determining adjustments to the individual's enhanced portfolio which would better align the enhanced portfolio with the individual's investment profile, and presenting said adjustments as a recommendation.

In an embodiment, the plurality of formats includes at least one of a statement, a web crawl, a feed file, and manual data entry.

In an embodiment the plurality of sources includes a plurality of financial institutions with which the individual holds investments.

In an embodiment, determining the source of the received account information includes performing a preliminary analysis of the account information to identify distinctive visual features, and associating the identified features with a particular template.

In an embodiment, the received account information is a paper statement, and extracting account data includes scanning the paper statement into a digital format and directing an OCR engine to extract the account data from the digital format of the paper statement according to a specific layout of the paper statement.

According to an aspect, a system for building an enhanced portfolio of an individual's investments is provided. The system includes: an enhanced portfolio database for storing account data relating to at least one of the individual's investment accounts; an ingesting module configured to: receive account information from a plurality of sources in a plurality of formats; select a recognition template corresponding to the determined source and format, the recognition template being selected from a plurality of recognition templates corresponding to different possible sources and formats of the account information; and apply the selected recognition template to extract the account data from predefined portions of the account information, said predefined portions being defined in the selected recognition template; and a storage module in communication with the ingesting module and the enhanced portfolio database, the storage module being configured to build the enhanced portfolio by aggregating account data extracted from account information received from the plurality of sources in the plurality of formats, and store the aggregated account data in the enhanced portfolio database.

According to an aspect, a computer readable medium is provided. The computer readable medium includes instructions stored on non-transient memory, said instructions being executable by a processor to cause the processor to perform the steps of: receiving account information relating to at least one of the individual's investment accounts, the account information being received from one of a plurality of sources in one of a plurality of formats; determining a source and a format of the received account information; automatically selecting a recognition template corresponding to the determined source and format, the recognition template being selected from a plurality of recognition templates corresponding to different ones of the plurality of sources and formats; applying the selected template to extract account data from predefined portions of the account information, said predefined portions being defined in the selected recognition template; and building an enhanced portfolio by aggregating the extracted account data with account data extracted from previously received account information.

BRIEF DESCRIPTION OF THE DRAWINGS

FIG. 2B illustrates the financial statement to which the template is applied.

FIGS. 3A to 3D are detail views of portions of the GUI of FIG. 3.

FIG. 4 illustrates an exemplary GUI for interacting with the enhanced portfolio in the form of a client holdings screen.

FIG. 5 illustrates an exemplary GUI for interacting with the enhanced portfolio in the form of a transaction and activities screen.

DETAILED DESCRIPTION

The present disclosure provides methods and systems for building an enhanced investment portfolio of an individual (such as a physical person or a legal entity) from a variety of sources of limited information in a substantially automated manner. The investment portfolio is enhanced through the aggregation of data from multiple sources and/or formats, and allows to more accurately assess an individual's investment profile. The portfolio can be built using information from sources such as, but not limited to, direct feed connections with financial institutions (custody relationships), third-party portals provided by financial institutions accessed using private credentials, periodic paper or electronic statements provided by financial institutions, formatted spreadsheets provided to financial professionals, or manually inputted data. Information obtained from these sources can be combined in order to create a portfolio that is more complete than any one of the sources individually. In creating such a portfolio, a broad range of information can be presented to users in a more interactive fashion through a single platform. Moreover, information from a combination of several different sources and/or formats can be interpreted in order to extrapolate more meaningful information (i.e. enhanced information) about an individual's financial profile which would not otherwise be available using any one of the sources individually.

Figure 6:
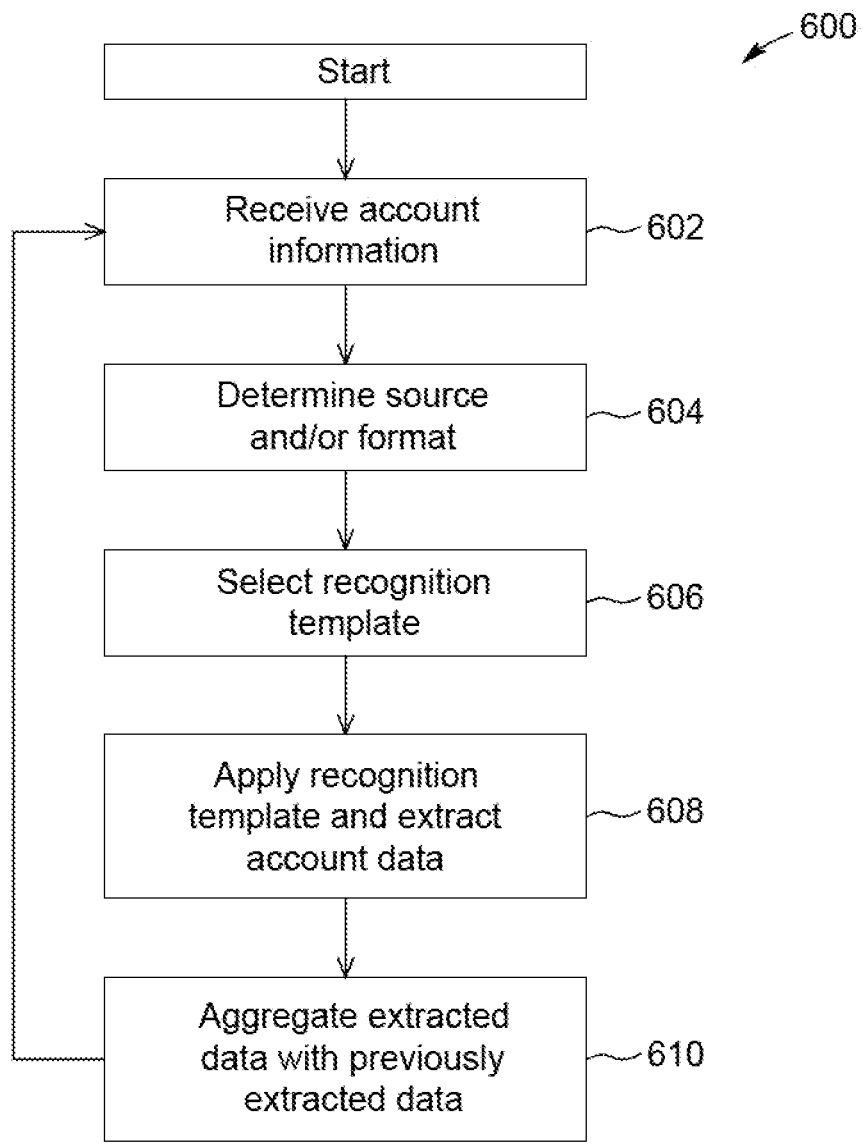
FIG. 6 is a flowchart illustrating a method for building an enhanced portfolio, according to an embodiment.

With reference to FIG. 6, a method 600 for building an enhanced investment portfolio is shown. The method includes a first step 602 of receiving account information relating to at least one of an individual's investment accounts. This information can be received from one of a plurality of sources, such as different financial institutions with which the individual holds an account. The information can further be received in one of a plurality of different formats, such as a paper or digital statement, a direct information feed, web scraping, and/or direct data input. Next, in step 604, the source and/or format of the received account information can be determined. In step 606, the determined source/format is used to select a recognition template from a plurality of predefined recognition templates. As will be explained later on, the recognition templates are used to extract data from the received account information. A different recognition template can be created for each possible source and/or format of financial information. Once the appropriate template is selected, the template is applied in step 608 in order to extract account data from portions of the account information predefined in the template. This extracted data is used to build an enhanced portfolio in step 610, where the extracted data is aggregated with data extracted from previously received information. Further details of this method 600 will be described hereinafter.

Figure 1:
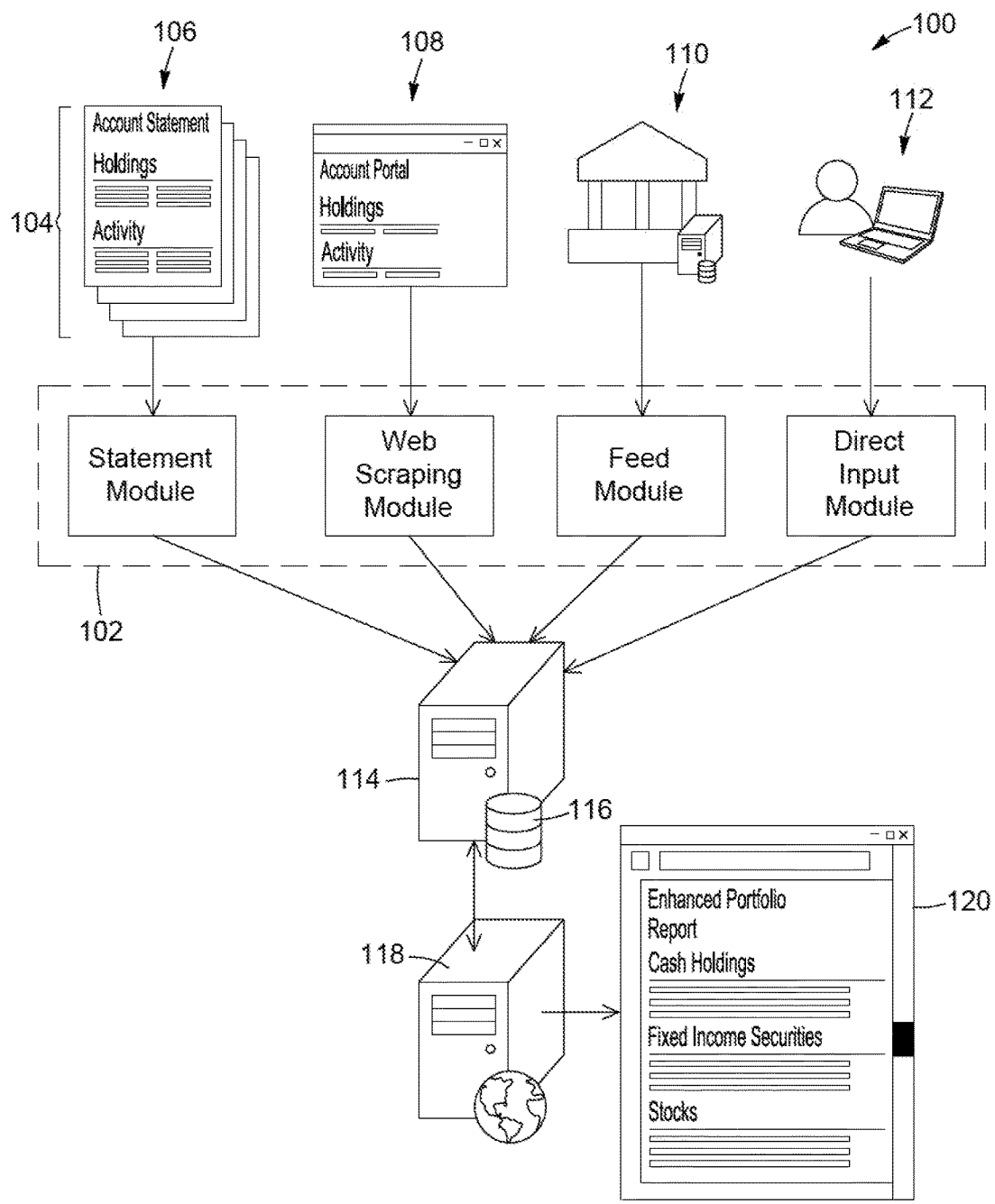
FIG. 1 is a schematic illustrating a system for building an enhanced portfolio, according to an embodiment.

An advantage of the present disclosure is that data acquired from a variety of sources is centralized. Accordingly, the platform can include a system for acquiring data from various sources and storing such data centrally. With reference to FIG. 1, an exemplary system 100 for building an enhanced investment portfolio is shown. The system 100 includes a variety of modules for carrying out different functions. As can be appreciated, the modules can be implemented in a number of configurations, for example as a single server, or a plurality of networked servers working together. The system 100 includes an ingesting module 102 for receiving account information in a plurality of formats 104 and extracting account data therefrom. In the illustrated embodiment, the plurality of formats include account statements 106, web scraping 108, a custody feed 110, and direct input by a user 112. Account information in these formats 104 can be provided from a plurality of sources. For example, several different financial institutions can provide information relating to one or several of an individual's account directly or indirectly to the system 100 in any of these formats.

Extracted account data is provided to a storage module 114 which is configured to build an enhanced portfolio by aggregating extracted account data from the plurality of sources, and store the data in an enhanced portfolio database 116. Preferably, the storage module 114 formats the extracted data such that it can be stored in the database 116 according to the database's storage schema.

A web interface 118 is provided, allowing users to access the enhanced portfolio, for example by generating an interactive enhanced report 120 containing data extracted and aggregated from each of the sources 104. Such an interface can further allow users to upload third-party documents or directly input data for processing and storage on the database. In this fashion, users are able to manually provide the platform with data which would not otherwise be available from third-party sources. The web interface can further allow users to consult stored data which make up the user's financial portfolio, for example through an interactive web portal which organizes and displays the wealth of information in a human-friendly manner. It is appreciated that, although not described in detail, the system can include a variety of other modules/servers to perform various other functions which will be described hereinafter.

Automated Data Entry

Data can be ingested by the platform in a number of different manners. Preferably, extraction of relevant data from various sources should be automated as much as possible. Raw data arriving from a custody feed, website scraping (such as a financial institution's web portal), PDF/paper statement scraping, or spreadsheet uploading can be processed and relevant financial data can be extracted therefrom using a predefined recognition template.

Figure 2A:
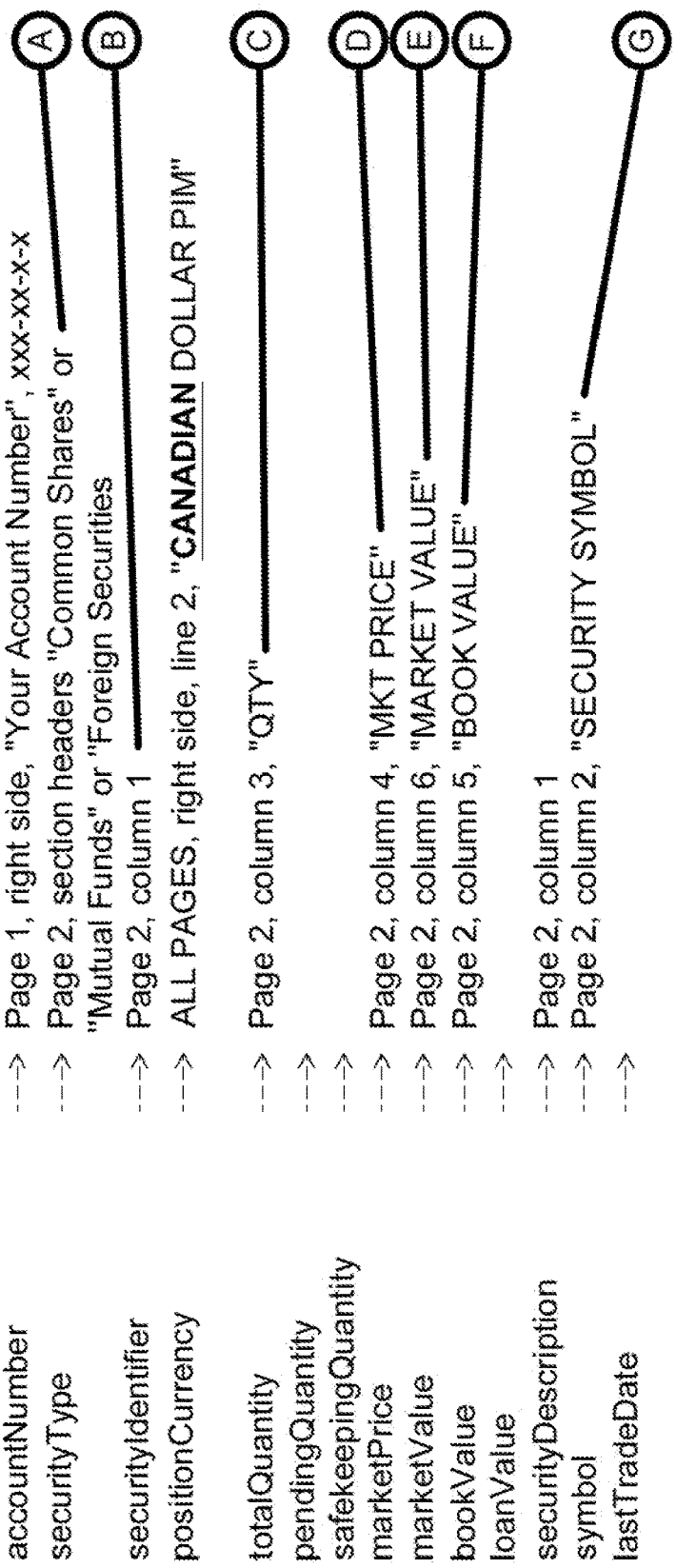
FIG. 2A illustrates an exemplary template which maps predefined portions of a financial statement to fields in a portfolio database.

As can be appreciated, each financial institution can have a standard format for their statements or web-portal which is common to all their clients. As illustrated in FIGS. 2A and 2B, an analyst can manually review the standard layout, including sections, paragraphs, lines, data columns and their relative position within a given report in order to identify locations where particular information is displayed. In so doing, the analyst can create a template 200 which defines the relevant position of each character of information that corresponds to a piece of data which is relevant and which can be extracted. The template 200 can further include a map 202 which maps the data to specific fields in the platform's database schema. As can be appreciated, templates can be created for each of the plurality of sources and formats of financial information which can be ingested by the system. Upon identifying the sources and format, the appropriate template can be selected, and the map can direct the ingesting module to automatically extract pertinent information for storage whenever a document with a corresponding template is received for processing.

In the illustrated example, the template 200 is provided in relation to a PDF document 204 corresponding to a financial statement displaying an individual's holdings. The template 200 directs position data (i.e. data relating to the individual's assets or holdings) to be extracted and stored. It is appreciated that a template can also be created for extracting other types of information contained in the statement, such as transactions and other activities. It is further appreciated that a template can be created for other types of documents and media as well, such as, but not limited to, images, audio files, spreadsheets, web pages, excel files, and data-interchange format documents (such as html, xml, json, etc.).

As illustrated, the template 200 includes references to several different portions of the document 204. For example, portion A points to predefined section headers on particular pages of the document 204, portion B points to items in a first column of the document 204, and portions C-G point to items in subsequent columns of the document 204 under predefined headings. The map 202 allows for data extracted in each of the portions to be mapped to a particular field in the portfolio database. For example, portion A maps to field "securityType", portion B maps to "securityIdentifier", etc.

i. In the present embodiment, the template 200 directs an optical character recognition (OCR) engine to extract information according to a visual arrangement of the document 204. Each line of document 204 corresponds to a holding, so the OCR engine is directed to visually parse each line in order to extract account data corresponding to each of the individual's holdings. Data extracted from each line can then be stored in the database, for example as a "holdings" entry whose fields are populated using the data extracted according to the map. A similar process can be applied, for example, to extract and store account activity, such as transactions, which may appear on a different section of the statement document 204. Electronic Feed from Source (Custody Feed) Information can be uploaded into the platform as a direct feed from a financial institution. This type of financial information arrives in its purest form; unedited and as a direct result of what is contained within the primary database from the deriving financial institution. In some embodiments, the feed is provided to the platform as data files which arrive on a recurring over-night basis. However, depending on the financial institution's particular practices, the periodicity and the format of the data arriving can vary. Preferably, the platform can be configured to process data as it arrives, at a regular interval to match the periodicity of the arriving data, and/or the processing of the data can be manually initiated.

In an embodiment, files can be received and processed in an automated manner. For example, files can be transferred to the platform over an SFTP (Secure File Transfer Protocol) connection. In this scenario, financial institutions either send files directly to the platform (PUSH) or automated scripts in the platform can retrieve files from financial institution servers (PULL). In a PUSH scenario, automated scripts process files once they have arrived on the platform, and the extracted data is used to update the database. In a PULL scenario, the platform runs automated scripts to go and retrieve files from financial institution servers, and then extract data therefrom to update the database. The scripts can be run by the server, for example, at a regular interval.

In some embodiments, feeds from some financial institutions can be uploaded manually. For example, certain institutions, for their own reasons, require manual access to a portal with a username and password, whereby their files are made available for manual downloaded. Platform administrators can thus login to the portal with the appropriate credentials, retrieve the data files (i.e. "fetch" the data files), and manually upload them to the platform for processing, extraction and storage in the database.

Whether the electronic feed data is acquired automatically or manually, the extraction of pertinent data can be substantially automated by using data recognition tools, including a combination of algorithms, optical character recognition (OCR), content mapping, data matching, etc. These data recognition tools allow associating each item of data contained in the feed with an appropriate placeholder/field according to the platform's database schema. In so doing, the extracted data is stored in a manner which is compatible with the database schema of the platform, and which is congruent with existing data already stored therein.

Data extracted in this manner can include but is not limited to, for example, account names, account numbers, securities information, transaction information, pricing information and any other information associated with a held public-market security. Once identified and accepted in the platform, the data can be associated with a client's financial portfolio (a client can include an individual or an entity's collective of accounts under the same name/registration). For example, the account names and account numbers can aid in identifying the client to whom the extracted information belongs. Once the client has been identified, the extracted information can be stored in the database in association with the identified client, and can be reconciled and aggregated with other information in the platform obtained by another module in another format, or received from another source.

Once stored in the database, the extracted data can be made available to clients. As will be explained in more detail, the information can be made available, for example, through a web-based service where individual users can log in using unique URL's specific to their firm (or themselves if they are individual users) and individual usernames and passwords assigned to each user. The extracted information can be presented through a multitude of different functions including holdings, activity, history, reporting, and within search parameter results. The information can further be categorically organized depending on the account preferences or consolidated view preferences (household, blended portfolio, etc.), and exported via various technology protocols for upload into downstream tools and technologies.

ii. Website Scraping

In some embodiments, the platform can retrieve data from sources on the web, such as from a financial institution's web-portal. Gathering data from such sources involves a web-scraping process which logs into a user's account on the financial institution's web portal, and extracts relevant data from various pages in the portal.

In order to allow the platform to retrieve data from a financial institution's web portal, a user must provide the platform with their access credentials, including their username, password, and any other security validation data required to access their account (such as answers to security verification questions). This information is preferably provided by the user through an input interface generated by the platform. Once received, the platform can connect to the financial institution's web-portal, for example through an HTTP or HTTPS connection, authenticate using the provided credentials, and request one or several pages or other documents accessible through the web portal which are known to contain data relevant to the user's financial profile.

In some embodiments, the platform can connect to the financial institution's web portal on a by-request basis by the user. For example the user can provide login credentials, and the platform can connect immediately to the financial institution's web portal to retrieve relevant information. When connections are made on a by-request basis, the platform will discard the credentials provided by the user, and the user will need to re-enter the credentials when making a subsequent request to retrieve data via web-scraping. In some embodiments, connection to the financial institution's web portal can be done on a recurring schedule. For example, when providing their credentials, the user can request that the platform automatically connect to the financial institution's web portal on a regular basis, such as daily, weekly, or monthly (for example through a prompt when inputting the credentials through an interface generated by the platform). In such embodiments, upon receiving credentials from the user, the credentials can be stored securely in the platform's database, and the credentials can be retrieved each time an automatic connection is initiated.

As can be appreciated, the retrieved pages or data can contain a mixture of human-readable data (i.e. in a format which can be naturally read by humans) and machine-readable data (i.e. in a format which facilitates the extraction, transformation, and processing of the data by a machine). In some cases, the machine-readable data can be interpreted by the machine in order to render it in a medium which can be naturally read by humans. For example, some or all of the retrieved pages or documents can contain data which is formatted in a markup language (such as html), or contain data in some other type of data structure or format (such as xml or json). Whether human-readable or machine-readable, the data contained in the retrieved pages or documents is not readily formatted for direct input into the platform's database. The retrieved pages and documents must therefore be analyzed in order to extract relevant data so that it can be stored in the platform according to the platform's database schema. Depending on the format of data being extracted, the platform can employ a variety of data recognition tools which use a combination of algorithms, OCR technology, content mapping, data matching, and other technologies to associate each bit of information received with an appropriate placeholder within the platform's database according to the storage schema. In so doing, the extracted data is stored in a manner which is compatible with the platform's database, and which is congruent with existing data already stored therein.

Data extracted from the web-scraping process can include, but is not limited to, account names, account numbers, securities information, transaction information, pricing information and all other information associated with a held public-market security. The information can be extracted, for example, by instructing the various tools (OCR, algorithms, etc.) to seek out specific information within the retrieved pages and documents, and associate this information with a specific field in the platform's database. For example, the tools can be directed to identify a transaction, and link each of its properties, such as the transaction type, value, price, number of shares, etc., with a corresponding placeholder in the platform's database according to the storage schema. In so doing, the platform will have an entry in its database corresponding to the identified transaction with all the extracted properties.

The extracted data can be used to contribute towards building an enhanced financial portfolio. Once the data is accepted, it can be stored in the database and associated with the user who provided the credentials for the web-portal. As will be explained in more detail, the data can then made available to the individual through a multitude of different functions including holdings, activity, history, reporting, and within search parameter results. The data can be categorically organized depending on the account preferences or consolidated view preferences (household, blended portfolio, etc.). Information collected in this manner can subsequently, or on an ongoing basis, be reconciled and aggregated with any other information obtained from any other modus apparatus within the platform. All such data can then be exported via various technology protocols for upload into downstream tools and technologies.

iii. PDF/Paper Statement Scraping

In some embodiments, data can be fed into the platform using documents which are intended to be primarily human-readable. For example, financial institutions regularly prepare statements which are mailed or otherwise transmitted to their clients, usually in a physical paper form or in a digitally accessible format such as a PDF document. In some cases, financial institutions provide financial professionals with spreadsheets containing data about their clients, for example in the form of a predefined template in a Microsoft Excel format. Although these documents are intended to be primarily understood by a human reader (and are thus not a strictly machine-readable format), a scraping process and/or a template recognition and data extraction can be employed which can involve converting these documents into a format which can be processed by the platform, and which preferably allows for relevant data to be identified and extracted for storage in the platform.

The process of scraping data from financial information such as periodic PDF and/or paper statements preferably involves the extraction of pertinent data from said statements using OCR technology. Software which employs a combination of algorithms and data recognition tools can be coded on top of an OCR framework, in order to read and decipher information contained within distributed account statements from various different financial institutions. The software is preferably configured to read each line, each column, and each character of an investment or banking statement, identify pertinent data, and determine where within in the platform's database storage schema each element of the pertinent data belongs. Similarly, the process of extracting data from spreadsheets (such as Microsoft Excel templates) involves identifying that the file corresponds to a predetermined template, and extracting pertinent data from rows, columns and/or cells of the spreadsheet. In this fashion, relevant data can be identified, and it can be determined where in the platform's database each element of the data belongs.

In order for the platform to process data from statements or other documents, the statements can be uploaded by users, for example through a user interface generated by the platform. Preferably, statements are uploaded in PDF format or Microsoft Excel format, which are either derived directly from a financial institution (i.e. the user downloaded the statement from their financial institution's web-portal, or received statements by email from their professional), or which are created from paper statements (i.e. the user received the paper statement by mail and converted it to PDF with the use of a document scanner). It is appreciated, however, that statements can be uploaded in different formats such as JPEG or other image formats. Moreover, they can be uploaded to the system through other means, such as by fax.

Due to the fact that the statements originating from various financial institutions differ from one another, the platform can be designed to accept inputs to aid it in applying its embedded code to decipher and extract information from the statement. When uploading statements or other documents, users are preferably provided with an interface which allows them to select the appropriate financial institution from a list of supported financial institutions. In some embodiments, however, the system can be configured to perform a preliminary analysis of the financial information in order to identify distinctive features of the information and associate it to a particular source. For example, in the case of a PDF statement, the system can recognize visual features such as logos, names, or other identifiers, in order to determine the appropriate template to apply to extract the information.

Figure 3:
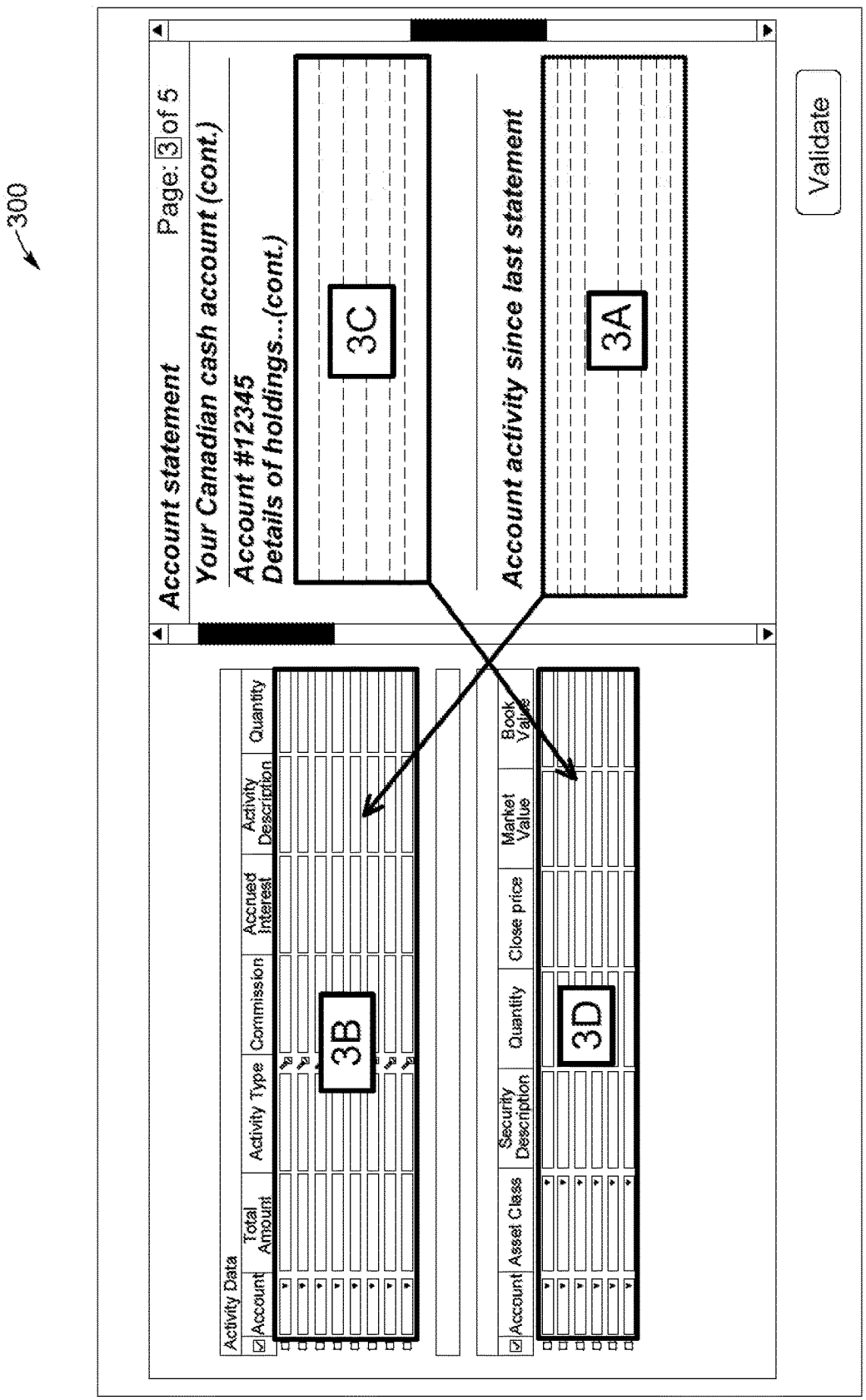
FIG. 3 illustrates an exemplary validation GUI, allowing users to validate and complete extracted data in a comparative view.

Once the statement or other document has been uploaded and the appropriate template has been applied, the user can be prompted to execute a verification of information whereby the extracted information is displayed directly next to the document in question and each entry from the document can be verified for accuracy against each entry pending to be uploaded into the platform. With reference to FIG. 3, users can be provided with a verification interface 300 which allows them to make modifications/adjustments to the pending uploaded information. As shown in FIGS. 3A and 3B, and FIGS. 3C and 3D, the extracted information is organized into individual cells which contain specific information extracted from the data source, including, but not limited to, account number, activity description, value, total units, value per unit, trade/process/settlement date, symbol, name, activity type, etc. During this phase, the user can modify the data should there be any errors as well as associate activity data with a foundation-database for future use in reporting. As can be appreciated, the activity types/descriptions vary from firm to firm, so users can be provided with an "Activity Configuration Tool" to link the extracted activity with a foundation/standard activity type (Ex: if a statement says DIV, it is understood that this means a "dividend", so the user should instruct the system to read DIV as a dividend now and for all future DIV entries from this specific statement type for this account). Once complete, the user can execute the upload of data, and the platform then allocates the data in question to the appropriate fields within the platform's database.

Data extracted in this manner can include, but is not limited to, for example, account names, account numbers, securities information, transaction information, pricing information and any other information associated with a held public-market security. Once identified and accepted in the platform, the data can be associated with a client's financial portfolio (a client can include an individual or an entity's collective of accounts under the same name/registration). For example, the account names and account numbers can aid in identifying the client to whom the extracted information belongs. Once the client has been identified, the extracted information can be stored in the database in association with the identified client, and can be reconciled and aggregated with other information in the platform obtained by another module or from another source, such as data extracted from previous periodic statements.

Manual Data Entry

Information not derived from any of the automated input formats (electronic feed from source, website scraping, PDF/Paper statement scraping) can be entered manually into the platform. In an embodiment, data can be manually entered by users directly via a user interface provided by the platform. For example, users can use an "Add Activity" feature to create new activities (transactions) within a specific off-book account or portfolio. Preferably, manual entries are not permitted for accounts linked to direct feeds (custody feeds) as these entries can cause conflicts with the incoming overnight electronic feed files. As such, manual entry of activities is preferably permitted only for off-book or virtual portfolios.

Data added through manual entry can include, but is not limited to, account information (names, numbers, etc.), public-market asset information, pricing, activity, or transaction information. The platform can also support more complex entries for non-public market holdings, real-estate, private-equity, personal belongings (art, antiques, collectibles, etc.), etc. When entering data, users must preferably complete a number of necessary fields including (but not limited to) date, activity type, activity description, and value/amount. Entry fields for asset information, pricing, and transaction history can also be completed in order to allow the platform to compile the most complete record of information as possible regarding a single asset or activity occurrence. The greater the amount of information inputted, the more efficient the platform can be at classifying said information correctly amongst other streams of data inputs originating from other sources. Information collected as of this manner can subsequently or on an ongoing basis be reconciled and aggregated with any other information obtained from any other data sources within the platform.

Consolidation of Data

Whether obtained through automated or manual data entry means, the platform is preferably configured to combine incoming data to build an individual's investment profile. Data entered into the platform is combined into "consolidated portfolios", i.e. an enhanced portfolio which contains data collected from inputs from various sources provided in various formats, and stored in connection with the individual's portfolio. For example, a specific client profile can include portfolio information for accounts uploaded by PDF statements, website scraping, and manual entry. So long as the like-information is inputted in the same manner, in essence positions of the same security in different accounts from different institutions need to have the same name, then in the consolidated portfolio view, all like-positions should be combined to show a true holistic consolidation of an individual's assets. Any variation in naming of securities, however, may not produce a combined result, but separated and most likely duplicate information (Ex: 100 shares of APPLE INC and 100 shares of APPL INC will not combine but instead be listed separately). Users can have the ability to merge like-positions that are otherwise duplicates by using the "Merge Positions" tool.

All such information can then be exported via various technology protocols such as a built-in export tool (which allows users to export information in a customized organisable format, for example for use with Microsoft Excel) for upload into downstream tools and technologies such as (but not limited to) TaxPrep, Sage50, Sage300, Case Ware, or any other financial analysis/reporting software that permits import.

Preferably, when consolidating data, the platform establishes a corresponding relationship between each of the data sources. "Like terms", i.e. similar terms used in different data sources/formats, can be linked so that if data from one source/format doesn't match data from another source/format (character for character), future uploads of data can be appropriately labelled and stored. For example, if the platform identifies 100 shares of APPLE INC from one data source corresponds to 100 shares of APPL INC from another data source, these like terms can be linked so future input corresponding to APPL INC can be labelled as APPLE INC. In some embodiments, the platform can produce a document that reflects the relationship described above referred to as a "map". A map in this scenario is a document of technical specifications to be used when data is extracted from one of the defined source, and can be based on the structure of the database, the information contained within the data source, and the positioning of data in the source in question.

The extraction, storing and consolidating of data is preferably performed by an automated computer module. Said module is preferably configured to accept input specifications mapping raw data from various input sources, and to provide an output in a structured manner in which all of the extracted relevant data is organised. The mapping documentation can be prepared and provided by an analyst, and is preferably prepared anew each time a new version of a given data source is provided. These include, but are not limited to, new financial institution statement types (RBC, TD, BMO, JPMorgan etc.) and/or new financial institution web platforms. The computing module can read these maps in order to understand how to extract data from each of the data sources, and substantially automate the remaining steps of extracting, storing and consolidating the data within the platform.

As can be appreciated, a number of constraints need to be addressed in order to allow the platform to accomplish the above-described tasks. A first constraint relates to the volume of documents and other sources of data which must be treated. In order to serve many individuals and institutions, a large number of documents must be treated on a recurring basis. For example, it can be expected that thousands or tens of thousands of pages will be subjected to the process of data mapping and extraction. The platform must therefore be implemented in a way to adequately manage storage issues and handle large volumes of data.

Another constraint relates to the variation of type of document formats that must be processed by the platform. Data can be provided to the platform in a wide range of formats, such as PDF reports sent electronically, scanned files, JPEG images, websites, documents received by fax, etc. Moreover, a client can submit data in one format in a given month, and then in subsequent months submit using a different format. The platform should preferably be flexible enough to handle any type of document format interchangeably, without imposing format consistency to users.

A further constraint relates to distributed multi-processing machines. The platform needs to be able to support web users who can operate in parallel from heterogeneous platforms. The platform must therefore preferably be able to process queries in parallel against remote and heterogeneous machines.

Referring back to FIG. 1, the illustrated system allows to address at least some of these constraints. The system can include a distributed multi-machine architecture, allowing to respond to many simultaneous remote queries from users on heterogeneous platforms. The architecture can be further configured to support distributed processing of information by cutting threads for parallel execution. The system can further include a variety of modules, each which can be dedicated to handling different data sources and/or data formats. The modules preferably interface via a generic framework which allows for data extracted from modules to be communicated to the rest of the system regardless of the source medium and/or format. For example, character recognition can be based on a generic template, using the XML standard, and the principle of generic parsers.

The system can be further configured such that new documents and new formats can be handled by the system without having to modify or recompile existing code. This can be accomplished through modifying the OCR employed in the digitization process. As discussed above, the OCR is designed to search for certain words/character combinations which appear frequently across data formats so that the information can be extracted. To account for small variations found in different data source formats (statement types, web platform types, etc.), code running on top of the OCR can be modified or added to improve the efficiency at which it is able to extract information from a wide variety of sources.

Preferably, the system is built using a "hub and spoke" blueprint. Each section of the platform analyses and processes different aspects of uploaded information to produce the desired results, and subsequently transmits the processed information to the central processing portion of the platform to be utilized throughout other sections. The "spokes", include but are not limited to, reporting, back-office, transactions, activity management, CRM, profile tools, and portfolio models. Each of the spokes can process data in a different manner, and then transmit this data to the "hub" which aggregates and consolidates all the information into a centralized location. The hub-and-spoke design of the platform allows the platform to compile large amounts of information about a specific client and apply it on an advisory or planning basis. Using the uploaded information, the platform can have the ability to calculate projection figures as well as report on historical parameters. Users can create projection reports to anticipate future growth and earnings within a client portfolio. This gives professionals the ability to make recommendations and suggest portfolio adjustments to better position their clients for the future. Using the embedded portfolio modeling tools, users can create models that are designed to adjust portfolios based on anticipated gains or losses as well as projected earnings from interest and/or dividends, to subsequently minimize the impact of these future events on a client's assets under management. Aside from the anticipatory features are the preparation tools. Users can circumvent the need to request reports and documentation from other financial-service providers of their clients and bring major efficiencies to both their own business and their clients. Within the reporting "spoke" of the platform, users can create reports for the preparation of income-tax-related matters. By utilizing the platform's ability to simultaneously aggregate and consolidate information from multiple financial institutions, users can amass all the necessary information regarding a specific client and request the necessary reports to aid in the preparation of income tax reports. Users can analyze returns, asset allocation, income/revenue, and geographical allocations in order to precisely position their clients for optimal tax efficiencies and to minimize the necessary administrative work to prepare a client for income-tax season. As well, users that do not offer income-tax preparation services or tax advisory services have the ability to do so because of the capabilities of both projective and reporting tools embedded in the platform. The reporting systems can be both IRS and CRM2 compliant to allow for accurate tax reporting in both Canada and the United States.

Enrichment/Supplement to Extracted Information

Preferably the platform is configured to complete extracted data, for example to ensure the integrity and completeness of data provided by users and other sources. For example, regardless of the accuracy and quality of the extraction of data, sometimes cases can arise where the data does not allow users to adequately complete an input of data.

Preferably, ensuring the completeness of data is done in two levels. A first level can involve a dynamic interaction of the user during the extraction process. As described above, this can involve displaying an original document and fields of data extracted therefrom in a side-by-side format, allowing the user to confirm the accuracy of extracted data and make corrections if necessary. Another level can involve automatic corrections made by the platform. Preferably, the platform deduces missing information from previously learned rules. For example, the platform can be configured to match extracted information and link it to existing data already in the system. (Ex: The extraction yields activity titled "div" for specific securities. The platform can then understand that any variation of the word DIVIDEND is considered to be a dividend activity-type. Same case for BUY/PURCHASE, or SELL/SOLD/REDEMPTION, etc.)

Preferably still, the platform is configured to enrich extracted information to provide users with more information than would otherwise be available to them from any single data source. Statements from financial institutions generally provide a limited and barebones amount of information and is based on a "need to know" relationship between firms and their clients. As such, with the ability to digitize statements and import the information into the platform, users can access a much richer and in-depth pool of information thanks to the flow of data received collectively. The platform can be configured to calculate performance measures such as ROR (rate of return) and IRR (internal rate of return). Moreover, the platform can provide users with robust portfolio information relative to the securities being held by each client that include both historical and forecasted figures (including but not limited to income/revenue, dividend, pricing, performance, etc.). For example, a statement will show an individual their respective holdings information including quantity, average cost, market value, closing price, and normally no more. However, once uploaded into the platform a user will gain access to historical pricing and revenue (interest/dividend/distribution) information regarding securities held, they can see forecasted information for advanced planning (expected revenue info), as well as historical information about their holdings history. As can be appreciated, uploading backdated information can be used to compile transaction history and build historical data regarding of a user's holdings.

It is appreciated that data can be enriched differently depending on the holding type. Fixed income securities normally appear from the various data mediums with a minimal amount of descriptive information. This usually consists of, but is not limited to, a name/description which includes a maturity date and interest value, as well as units held, possibly a book-value, and most likely a maturity value or market value. From this limited information, the platform can produce a much more in-depth view of the position because of the constantly growing database of information garnered from the entire wealth-management platform client base. From the security issuer (ex: Bell Canada) and the issue-description (20-Jun-25 3% bond) the platform can decipher the yield to maturity, current yield to market, coupon rate, coupon value, present value (market value), duration, credit-rating, projected cash-flow to maturity, and many other parameters. This process can involve a comparison of securities contained in the extracted data compared to other securities in the realm of the platform. Because information received from other sources (custody feeds) contain more data, the system can search and match information retrieved from an extraction. As well, with the limited information extracted from statements and web portals, mathematical calculations can be used to determine certain values (YTM (yield-to-maturity), current yield, etc.). Users of the platform benefit by having the ability to build and advise based on the expanded information. Professionals can make long-term planning recommendations base on YTM and projected cash-flow values, and they can make immediate asset allocation adjustments based on current yield and credit-rating, just to name a few.

Much like fixed income, equity information can arrive to the platform from various mediums with limited information. Under normal circumstances the position information consists of, but is not limited to, a name, number of units currently held, book value (total or per unit), and a market value (total or per unit). The ability to enhance on the existing information lies within the accuracy of the identifying "tag" associated with the position which is usually in the form of a symbol, or name. From this, the platform can derive yield information if the security issues a dividend, corporate action history (split or reverse-split), and historical pricing information. In addition, with the received information (assuming accuracy) the platform can have the ability to produce calculations for both long-term, and short-term planning needs. The platform can calculate dividend yield at purchase as well as last-closing to aid in annual growth planning, income YTD, income since inception, current gain or loss (unrealized), projected dividends, and realized gain or loss (if position not fully realized) values for annual tax planning and asset allocation planning.

The enhancements provided to mutual fund and other distributing securities can be much like those provided to equity and equity-like securities. The major difference lies with the distribution provided to holders at year-end. This category of securities provides its shareholders with an annual distribution instead of standard dividend or interest payments. However, the distribution is usually, but not always, a lump-sum and unclassified payment amount. Sometime after receiving the distribution payment, the issuer will provide a breakdown of the distribution for allocation of taxable amounts. The breakdown usually consists of, but is not limited to, dividends, interest, capital gains or losses, and return-of-capital amounts. This is an amending entry for a previously entered transaction. The platform can automatically adjust the past entry as well as subsequent calculation results (interest received, dividends received, realized gains or losses, etc.) to reflect the amended amount. As well, users can have the ability to create their own allocation tables for distributions in order to more accurately plan for income-tax purposes and reduce the amendments in the future. In addition, based on historical distribution data, users can improve tax-related planning by reviewing historical distribution schedules and rates for clients whose year-end cycles are not in sync with distribution dates (case for most).

The ability to enhance securities information based on a provision of limited details can vastly enhance a user's ability to execute their job, fulfill their contractual agreements with their own clients to provide the best service offering possible, and ensure that advisors and managers are equipped with the most enhanced tools available to grow and maintain their business.

Use of Extracted Data

An advantage of the above-described platform lies within the use of data after it has been extracted from the variety sources (manual entry, direct custodial feed, web-scrape, excel-template upload, and document-scrape, etc.). After the data has been verified, the platform can organize the extracted data into a format which is more "readable" and "usable" (i.e. more interactive) for users. For example, the extracted data can be presented such that it forms part of an enhanced investment portfolio, instead of a paper statement or list of extracted data.

The extracted data can be accessed by users from a variety of access points to the platform. In an embodiment, the data can be made primarily accessible/readable through a user-accessible web portal generated by the platform. The portal can include a "main screen" or primary access point, which is the Client Holdings Screen. This page can be a dynamic representation (i.e. via embedded hyperlinks, and data that is updated daily) of a client's portfolio. An "Activities Menu"

can be provided, corresponding to a section where each individual activity (buy, sell, transfer, interest paid or received, dividend received, etc.) is listed in chronological order. The data displayed here can be sorted, extracted and searched upon. As well, subsequent reports and tables can be derived and executed in a "Report Wizard", which can correspond to a report-building tool that creates PDF reports based on user credential inputs (dates, securities or portfolio info, etc.). Lastly the data can be exported into Microsoft Excel or other third-party software using an "Export Tool" where a user can design an export template to extract information from the system to be used in third-party solutions or for manipulation/reporting within Microsoft Excel.

With reference to FIG. 4, the Client Holdings Screen 400 can organize data pertaining to securities held/owned into asset classes as determined by a combination of data received and user-selected options (users can have the ability to define their own asset classes, equity, fixed-income, etc., to include or exclude items of their choice). As can be appreciated, this screen is generated post-extraction from any data source, and can be generated based on information extracted from one or several data sources, regardless of the sources. This screen can display the collective holdings of all accounts belonging to the user in question be it individual or entity. Organized tabs at the top of the screen can further divide the same holdings information into subdivisions of individual accounts. Each separate tab available represents a single unique account (investment or banking related) associated to the specific client profile (individual or entity). From this screen users can navigate throughout the portal to various sections where other accompanying information from the extraction or information derived from the extraction, including but not limited to, activity and transaction information, for example as shown in FIG. 5. As can be appreciated, the activity and transaction page 500 demonstrates that data has been extracted from various sources and is stored line-by-line in the database. This information is accessible at any time, and a user has the ability to adjust each transaction when necessary.

Beyond the Client Holdings Screen, the platform can provide a breadth of features to users. The platform can perform detailed search requests to seek out specific data entries based on, but not limited to, securities information, dates, activity types, associated account numbers, profiles, pricing information, and transaction information. Users can request and produce extensive reports detailing, but not limited to, asset allocation, sector and geographical allocation, transactional history information, realized income from interest or dividends, realized gain & loss information, projected information regarding income from interest or dividends, projected gain & loss information, and foreign asset classification and information for tax-preparation. Users can manage CRM-related affairs using the embedded email client as well the incorporated calendar module to, but not limited to, communicate with their clients, schedule meetings, and send group messages to both internal and external contacts. The platform also includes a batch and distribute function whereby users can, but are not limited to, execute a batch requests for reports and have the resulting PDF's issued directly to clients by email, create batch requests for internal reports to review revenue, billing and fees, review client transactions, or produce monthly client statements.

Tangent to the multiple features that incorporate extracted and uploaded information, the platform can be provided with a section dedicated to the management of client assets. The integrated transaction and modeling features can allow investment and wealth professionals to manage investment portfolios held with third-party institutions and execute allocation strategies as they see fit with their clients. The platform can communicate with external systems and licensed users can, but are not limited to, execute buy and sell orders for market-listed securities, create bulk-trading orders to purchase or sell securities in large quantities to be allocated to multiple accounts after the transaction has settled (used for accounts under discretionary management only), establish and execute allocation/strategic balancing orders whereby transactions occur across a portfolio to re-balance asset allocations based on predetermined and previously established portfolio models (or investment profiles) set as a benchmark against a specific client (individual or entity) portfolio. The platform can allow users to create benchmark models or investment profiles in the back-office portion of the platform. Said models can include security classes (equity, fixed income, etc.), sectors (finance, consumer staples, energy, etc.), geographical sectors (Canada, USA, EAFE, etc.), individual securities (specific single securities), and security baskets (custom funds, group of securities, etc.). Models can then be associated to specific clients or groups of clients for comparative and management purposes. Actively managed enhanced portfolios can then be compared by the system to their respective models/profiles to analyze for consistency and matching. When a portfolio/account's allocations deviate from the model, users can be notified and the platform can automatically recommend adjustments to return the portfolio to the model's criteria. Said recommendations can be based on actual allocation parameters in direct comparison with the model in question (Ex: If the portfolio in question is 5% overweight Canadian securities, the system can recommend to sell 5% of each security classified as Canadian—users can elect to make their own adjustments to return the portfolio to match the model, however the system is programmed to make recommendations that are mathematically derived and unbiased to specific securities).

The invention claimed is:

1. A method for building an enhanced portfolio of an individual's investments, the method comprising:
   a) receiving account information relating to at least one of the individual's investment accounts, the account information being received from one of a plurality of sources in one of a plurality of formats;
   b) automatically recognizing distinctive features in the received account information, said distinctive features comprising at least one of: a logo, a name, a financial institution identifier, a document identifier, a document layout, a position of data, and a visual arrangement of a document;
   c) automatically determining a source and a format of the received account information based at least in part on a plurality of the distinctive features;
   d) automatically selecting a recognition template corresponding to the determined source and format, the recognition template being selected from a plurality of predefined recognition templates, each of the plurality of predefined recognition templates defining, for a given source and format, a map between portions of account information and fields of an enhanced portfolio database;
   e) applying the selected recognition template to extract account data from the predefined portions of the account information; and f) building the enhanced portfolio by aggregating the extracted account data with account data extracted from account information previously received from other sources or in other formats.

2. The method according to claim 1, further comprising generating a comprehensive report of the enhanced portfolio comprising enhanced data relating to the individual's enhanced portfolio, said enhanced data being obtained through the aggregation of the account data.

3. The method according to claim 2, wherein the enhanced data comprises metrics of historical, current or projected performance of the individual's investments calculated using the aggregated account data.

4. The method according to claim 1, wherein upon determining that the format of the received account information corresponds to a paper or digital statement, step d) comprises directing an optical character recognition (OCR) engine to extract the account data from the paper or digital statement according to a visual arrangement of the paper or digital statement.

5. The method according to claim 1, wherein the map defines a relationship between terms used in the account data and predetermined activity types, and wherein step d) comprises recognizing said terms and creating records in the enhanced portfolio database corresponding to said activity types.

6. The method according to claim 1, further comprising the step of generating a validation graphical user interface (GUI), the validation GUI displaying the account information in a comparative view with the extracted account data and corresponding associated fields of the enhanced portfolio database, the validation GUI allowing a user to validate and modify the extracted data prior to storage in the enhanced portfolio database.

7. The method according to claim 1, wherein aggregating the extracted account data comprises consolidating the extracted account data with account data extracted from account information previously received from another source.

8. The method according to claim 7, wherein consolidating the extracted account data comprises matching terms in the extracted account data with similar terms in the account data extracted from account information previously received from another source, and relabeling the terms in the extracted data to conform to the similar terms in the account data extracted from account information previously received from another source.

9. The method according to claim 7, wherein consolidating the extracted data comprises determining duplicated data in the extracted data and the account data extracted from account information previously received from another source, and merging the extracted data with the account data extracted from account information previously received from another source.

10. The method according to claim 9, further comprising generating a merge GUI, said merge GUI allowing a user to identify the duplicated data, and to initiate a merge of said duplicated data.

11. The method according to claim 1, wherein the received account information comprises a current periodic account statement, and wherein aggregating the extracted account data comprises consolidating the extracted account data with account data extracted from a previous periodic account statement already stored in the enhanced portfolio database.

12. The method according to claim 1, further comprising the step of identifying investment types in the individual's enhanced portfolio, and comparing said investment types to a predetermined set of investment profiles in order to determine a closest matching investment profile of the individual.

13. The method according to claim 12, further comprising comparing historical holdings in the individual's enhanced portfolio with the predetermined set of investment profiles in order to identify a change in the individual's investment profile.

14. The method according to claim 12, wherein the enhanced portfolio comprises account data from a plurality of investment accounts, and the method further comprises comparing holdings in the plurality of accounts to identify inconsistencies between the individual's investment profile and the individual's actual holdings.

15. The method according to claim 14, further comprising automatically determining adjustments to the individual's enhanced portfolio which would better align the enhanced portfolio with the individual's investment profile, and presenting said adjustments as a recommendation.

16. The method according to claim 1, wherein the plurality of formats include at least one of a statement, a web crawl, a feed file, and manual data entry.

17. The method according to claim 1, wherein the plurality of sources comprise a plurality of financial institutions with which the individual holds investments.

18. The method according to claim 1, wherein determining the source of the received account information comprises performing a preliminary analysis of the account information to identify distinctive visual features, and associating the identified distinctive visual features with a particular source.

19. The method according to claim 1, wherein the received account information is a paper statement, and extracting account data comprises scanning the paper statement into a digital format and directing an OCR engine to extract the account data from the digital format of the paper statement according to a specific layout of the paper statement.

20. The method according to claim 1, wherein:
step e) comprises extracting an account identifier comprising at least one of: an account name, an account number, a securities information, a transaction information, and a pricing information; and
step f) comprises associating the account information with the individual based at least in part on the extracted account identifier, and building the enhanced portfolio by aggregating the extracted account data with account data extracted from account information previously received from other sources or in other formats and also associated with the same individual.

21. The method according to claim 1, wherein the individual is a person or a legal entity.

22. A system for building an enhanced portfolio of an individual's investments, the system comprising:
an enhanced portfolio database for storing account data relating to at least one of the individual's investment accounts, said enhanced portfolio database comprising fields for storing different types of account data;
an ingesting module configured to:
receive account information from a plurality of sources in a plurality of formats;
automatically recognize distinctive visual features in the received account information, said distinctive visual features comprising at least one of: a logo, a name, a financial institution identifier, a document identifier, a document layout, a position of data, and a visual arrangement of the document;

automatically determine a source and a format of the received account information based at least in part on a plurality of the distinctive features;

automatically select a recognition template corresponding to the determined source and format, the recognition template being selected from a plurality of predefined recognition templates, each of the plurality of predefined recognition templates defining, for a given source and format, a map between portions of account information and fields of an enhanced portfolio database; and apply the selected recognition template to extract the account data from the predefined portions of the account information; and a storage module in communication with the ingesting module and the enhanced portfolio database, the storage module being configured to build the enhanced portfolio by aggregating account data extracted from account information received from the plurality of sources in the plurality of formats, and store the aggregated account data in the enhanced portfolio database.

23. A computer readable medium comprising instructions stored on non-transient memory, said instructions being executable by a processor to cause the processor to perform the steps of:

a) receiving account information relating to at least one of the individual's investment accounts, the account information being received from one of a plurality of sources in one of a plurality of formats;

b) automatically recognizing distinctive features in the received account information, said distinctive features comprising at least one of: a logo, a name, a financial institution identifier, a document identifier, a document layout, a position of data, and a visual arrangement of a document;

c) automatically determining a source and a format of the received account information based at least in part on a plurality of the distinctive features;

d) automatically selecting a recognition template corresponding to the determined source and format, the recognition template being selected from a plurality of predefined recognition templates, each of the plurality of predefined recognition templates defining, for a given source and format, a map between portions of account information and field of an enhanced portfolio database;

e) applying the selected recognition template to extract account data from the predefined portions of the account information; and f) building an enhanced portfolio by aggregating the extracted account data with account data extracted from account information previously received from other sources and in other formats.

* * * * *